(12) United States Patent
Choi et al.

(10) Patent No.: US 8,300,612 B2
(45) Date of Patent: Oct. 30, 2012

(54) MEDIUM ACCESS CONTROL METHOD AND DATA TRANSMISSION METHOD USING THE SAME IN WIRELESS LOCAL AREA NETWORK

(75) Inventors: Jee-Yon Choi, Daejon (KR); Yoo-Seung Song, Daejon (KR); Yun-Joo Kim, Suwon-si (KR); Hyun-Gu Park, Seoul (KR); Kwhang-Hyun Ryu, Daejon (KR); Sok-Kyu Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 988 days.

(21) Appl. No.: 12/129,007

(22) Filed: May 29, 2008

(65) Prior Publication Data

US 2009/0154405 A1    Jun. 18, 2009

(30) Foreign Application Priority Data

Dec. 17, 2007    (KR) .................. 10-2007-0132494

(51) Int. Cl.
  *H04W 4/00* (2009.01)
  *H04W 72/00* (2009.01)
  *H04J 3/24* (2006.01)
  *H04Q 11/00* (2006.01)
(52) U.S. Cl. ........ 370/338; 370/329; 370/349; 370/388; 455/450; 455/451; 455/452.1; 455/452.2; 455/453
(58) Field of Classification Search .................. None
See application file for complete search history.

(56) References Cited

U.S. PATENT DOCUMENTS

| | | | |
|---|---|---|---|
| 6,996,083 B1* | 2/2006 | Balachandran et al. | 370/337 |
| 7,436,809 B2* | 10/2008 | Harada et al. | 370/338 |
| 7,496,081 B2* | 2/2009 | Salokannel et al. | 370/348 |
| 7,751,363 B1* | 7/2010 | Etemad et al. | 370/329 |
| 2006/0264177 A1* | 11/2006 | Heidari-Bateni et al. | 455/62 |
| 2007/0201397 A1* | 8/2007 | Zhang | 370/329 |
| 2007/0201399 A1* | 8/2007 | Lee et al. | 370/329 |
| 2007/0230408 A1* | 10/2007 | Trainin et al. | 370/338 |
| 2007/0280156 A1* | 12/2007 | Kwon et al. | 370/328 |
| 2008/0137618 A1* | 6/2008 | Sung et al. | 370/336 |
| 2008/0139216 A1* | 6/2008 | Lee et al. | 455/452.2 |
| 2008/0159278 A1* | 7/2008 | Balraj et al. | 370/388 |
| 2008/0186945 A1* | 8/2008 | Ahn | 370/349 |

FOREIGN PATENT DOCUMENTS

| | | |
|---|---|---|
| KR | 1020010032227 A | 4/2001 |
| KR | 10-2006-0003560 | 1/2006 |
| KR | 1020060083931 A | 7/2006 |
| KR | 1020070073626 A | 7/2007 |

* cited by examiner

*Primary Examiner* — Ricky Ngo
*Assistant Examiner* — Brian T Le
(74) *Attorney, Agent, or Firm* — Kile Park Goekjian Reed & McManus PLLC

(57) ABSTRACT

Provided are a MAC method and a method for transmitting data using the same in a WLAN. The MAC method includes: transmitting a bandwidth scheduling report frame for informing information on downlinks and uplinks allocated to a terminal by including the bandwidth scheduling report frame in one of the downlinks where the bandwidth scheduling report frame includes a plurality of downlinks, a plurality of uplinks, and a plurality of short uplinks and the number of the plurality of downlinks is equal to the number of the plurality of uplinks; receiving a bandwidth request frame for requesting bandwidth allocation through one of the uplinks; and allocating a bandwidth to each of the terminals by an unit of the downlink and the uplink.

20 Claims, 3 Drawing Sheets

MEDIUM ACCESS CONTROL METHOD AND DATA TRANSMISSION METHOD USING THE SAME IN WIRELESS LOCAL AREA NETWORK

CROSS-REFERENCE TO RELATED APPLICATIONS

The present invention claims priority of Korean Patent Application No. 10-2007-0132494, filed on Dec. 17, 2007, which is incorporated herein by reference.

BACKGROUND OF THE INVENTION

1. Field of the Invention

The present invention relates to a medium access control (MAC) method and a method for transmitting data using the same in a wireless local area network (WLAN); and, more particularly, to a MAC method and a method for transmitting data using the same in WLAN, which perform bandwidth allocation and bandwidth release by a unit of a downlink and an uplink which form a superframe in a WLAN, thereby reducing an amount of information to process for scheduling so as to enable high speed data processing.

This work was supported by the IT R&D program of MIC/IITA [2006-S-002-02, "IMT-Advanced Radio Transmission Technology with Low Mobility"].

2. Description of Related Art

A wireless local area network (WLAN) system adopts a technology for transmitting data using wideband frequency spreading based on narrowband. The WLAN system has been standardized through IEEE 802.11. In the WLAN system, a MAC layer enables a plurality of terminals to access a shared channel. In 802.11 standard, Carrier Sense Multiple Access/Collision Avoidence (CSMA/CA) is generally used as an access method.

FIG. 1 is a diagram illustrating a structure of a MAC protocol.

As shown in FIG. 1, a MAC protocol includes a Frame Control field, a Duration ID (identifier field, four Address fields, a Sequence Control field, a Frame Body field, and a CRC (cyclic redundancy check) field. The Frame Control field includes information on a type of a corresponding frame and fragmentation. The Duration ID field includes information on an association identity (AID) in case of a power save mode or includes a duration value for each frame type for any other cases. The CRC field is for checking error.

A WLAN system supports a bandwidth of about several tens Mbps. In case of 802.11n, the WLAN system supports a bandwidth of about 100 Mpbs. However, newly introduced Ethernet based services request further wider bandwidth. Therefore, it is necessary to develop a WLAN system to provide a wideband of about several Gbps. However, the 802.11 based technology has limitation to support such wideband. In order to overcome the limitation, many studies have been in progress for developing a time division multiple access (TDMA) WLAN system.

A MAC protocol for the TDMA WAN system includes a map field, a downlink field, a poll request field, and an uplink field. The map field includes information on a location and configuration of a subframe. The downlink field stores download data to be transmitted from a wireless base station to a terminal. The poll request field requests a wireless base station and terminals to allocate a bandwidth for subframes. The uplink field stores upload data to be transmitted from a terminal to a wireless base station. Here, the poll request field is included in a bandwidth request transmitted to each of terminals and is also included in a response thereof.

As described above, the MAC protocol requests high speed data processing because the bandwidth allocation request and the response thereof are present in the poll request frame together. If not, the length of the poll request frame must be disadvantageously very long.

SUMMARY OF THE INVENTION

An embodiment of the present invention is directed to providing a MAC method and a method for transmitting data using the same in WLAN, which perform bandwidth allocation and bandwidth release by a unit of a downlink and an uplink which form a superframe in a WLAN, thereby reducing an amount of information to process for scheduling so as to enable high speed data processing.

In accordance with an aspect of the present invention, there is a medium access control (MAC) method for a wireless local area network (WLAN), including: transmitting a bandwidth scheduling report frame for informing information on downlinks and uplinks allocated to a terminal by including the bandwidth scheduling report frame in one of the downlinks where the bandwidth scheduling report frame includes a plurality of downlinks, a plurality of uplinks, and a plurality of short uplinks and the number of the plurality of downlinks is equal to the number of the plurality of uplinks; receiving a bandwidth request frame for requesting bandwidth allocation through one of the uplinks; and allocating a bandwidth to each of the terminals by an unit of the downlink and the uplink.

In accordance with another aspect of the present invention, there is a method for transmitting data using a medium access control (MAC) protocol in a wireless local area network (WLAN), including: transmitting a bandwidth schedule report frame to terminals in order to inform information on downlinks and uplinks allocated to each of the terminals; receiving a bandwidth request frame for requesting bandwidth allocation from the terminals; allocating a bandwidth to each of the terminals according to a necessary bandwidth by a unit of a downlink and an uplink based on the bandwidth request frame; transmitting a bandwidth schedule report frame having allocated information to each of the terminals; and transmitting data frames and an acknowledge frame for a received frame through the allocated downlink and uplink.

In accordance with another aspect of the present invention, there is a method for transmitting data using a medium access control (MAC) protocol in a wireless local area network (WLAN), including: receiving a bandwidth schedule report frame for informing information on downlinks and uplinks allocated to each of terminals from a base station; transmitting a bandwidth request frame to the base station for requesting bandwidth allocation; receiving a bandwidth schedule report frame having information on bandwidth allocated according to necessary bandwidth by a unit of a downlink and a uplink to each of the terminals from the base station; and transmitting data frames and an acknowledge frame for a received data through the allocated downlinks and uplinks.

Each of the plurality of downlinks may include a first acknowledge frame for informing whether data frames included in a previous uplink are successfully received or not, and a plurality of downlink data frames, and at least one of the downlinks includes the bandwidth schedule report frame.

Each of the plurality of uplinks may include a second acknowledge frame for informing whether data frames included in a previous downlink are successfully received or not and a plurality of uplink data frames and a plurality of uplink data frames, and at least one of the uplinks includes the bandwidth request frame for requesting allocation of a bandwidth as much as a predetermined bandwidth needed in future.

The short uplink may be formed of the bandwidth request frame for requesting bandwidth allocation.

The bandwidth schedule report frame may include a control header for informing control information of a frame, an medium access control identifier (MAC ID) for informing a type, a transmission address, and an receipt address of data in a frame, a bandwidth schedule request control field for informing configuration information of a corresponding superframe and the number of terminals allocated with a bandwidth, a bandwidth schedule request information field for informing a bandwidth allocated to each of terminals allocated with a bandwidth, and a cyclic redundancy check (CRC) field for checking an error of a frame.

The bandwidth schedule request control field may include a sequence number of a corresponding superframe, a length of one downlink, a length of one uplink, the number of short uplinks included in a corresponding superframe, and the number of terminals using a corresponding superframe.

The bandwidth schedule request information field may include an address of a corresponding terminal information for informing a corresponding terminal of allocated downlinks, information for informing a corresponding terminal of allocated uplinks, and a maximum length of a frame available to a corresponding terminal for transmitting data to an uplink.

The bandwidth request frame may include a control header for informing control information, a MAC ID for informing a type, a transmission address, and an receipt address of data in a frame, information on a type of data traffic to be transmitted through a requested bandwidth, information on a size of a necessary bandwidth, and a cyclic redundancy check (CRC) field for checking an error of a frame.

The acknowledge frame may include a control header for informing control information, a MAC ID for informing a type, a transmission address, and an receipt address of data loaded in a frame, a sequence number of a first data frame among successfully received data frames, information on whether each of data frames are successfully received or not from a data frame having the sequence number, and a cyclic redundancy check (CRC) field for checking an error of a frame.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
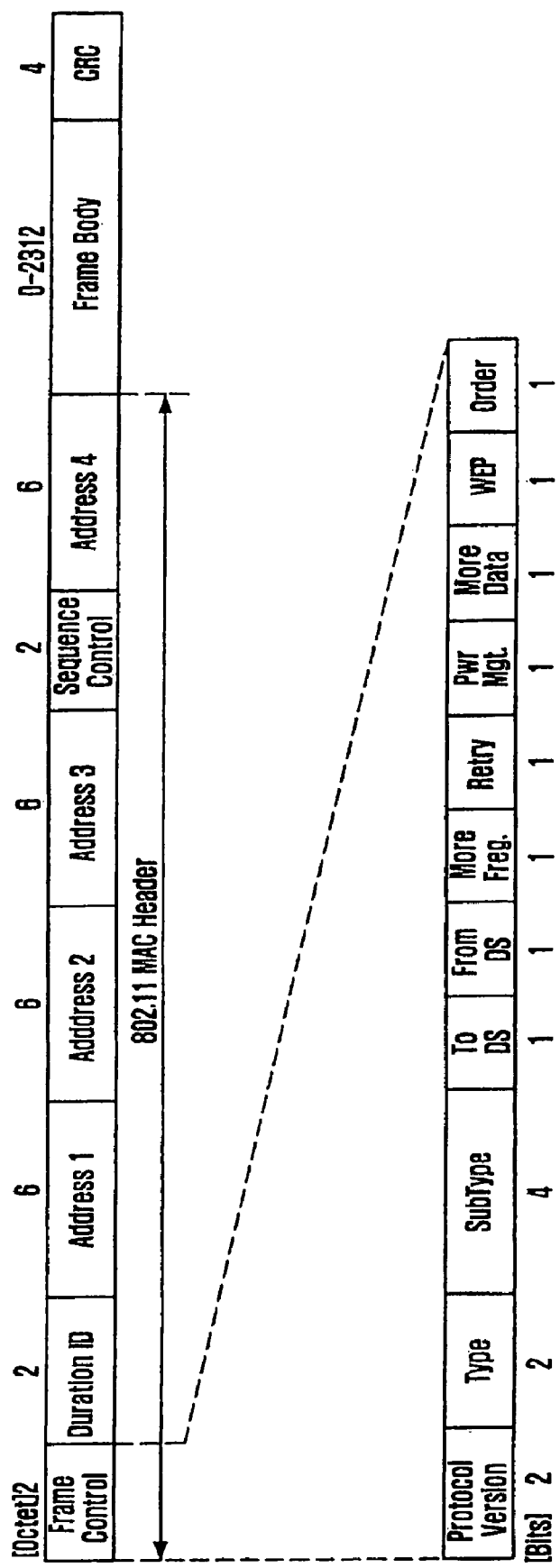
FIG. 1 is a diagram illustrating a structure of a MAC protocol.
Figure 2:
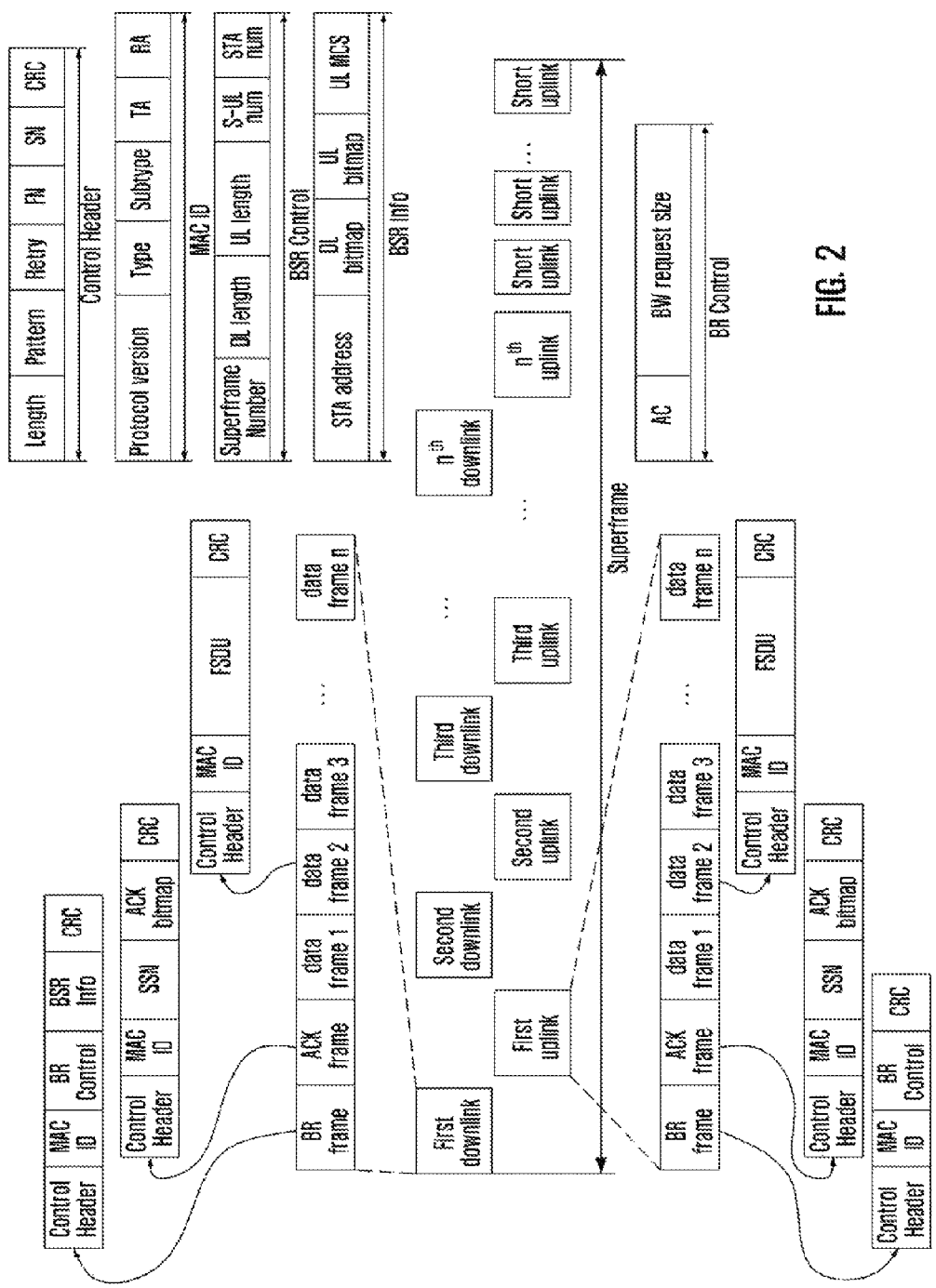
FIG. 2 is a diagram illustrating a structure of a superframe which is a MAC protocol frame in accordance with an embodiment of the present invention.

FIG. 2 is a diagram illustrating a structure of a superframe which is a MAC protocol frame in accordance with an embodiment of the present invention. As shown in FIG. 2, the superframe includes a plurality of downlinks, a plurality of uplinks, and a plurality of short uplinks. The number of downlinks is identical to that of the uplinks.

The plurality of downlinks are used for transmitting data from a WLAN base station to a WLAN terminal. The plurality of uplinks are used for transmitting data from a WLAN terminal to a WLAN base station.

One downlink or one uplink includes a plurality of frames. A length of a frame is set up according to a state of a wireless channel in a corresponding WLAN in order to reduce a frame error rate. For example, the length of a frame is set up to be comparatively long if the wireless channel state is good. If not, the length of a frame is set up to be comparatively short. Therefore, a maximum length of a frame is decided according to a state of a wireless channel. In case of transmitting data longer than the maximum length thereof, the data is transmitted after the data is divided into a plurality of frames.

In a superframe, a first downlink includes a Bandwidth Schedule Report (BSR) frame, an Acknowledge (ACK) frame, and data frames. The BSR frame informs all WLAN terminals of a bandwidth allocation state of a corresponding superframe. The ACK frame is confirmation for receiving a latest uplink from a WLAN terminal. From a second downlink, the downlinks do not include a BSR frame. The downlinks include an ACK frame for confirmation of receiving the latest data received from a WLAN terminal and data frames that are transmitted to a corresponding terminal.

The uplink includes an ACK frame and data frames. The ACK frame is acknowledge for the latest downlink that a WLAN terminal receives. The data frames are data to be transmitted from a base station to a corresponding terminal. One of uplinks allocated to one terminal includes a Bandwidth Request (BR) frame that requests allocation of a bandwidth to be used in the next superframe.

The short uplink includes a BR frame.

Hereinafter, a structure of each frame will be described. As shown in FIG. 2, all of frames commonly include a control header, a medium access control identifier (MAC ID), and a cyclic redundancy check (CRC) field for checking an error of a frame.

The control header includes a length field denoting a length of a corresponding frame, a pattern field for identifying the control header, a retry field for informing whether a corresponding frame is retransmitted or not, a fragmentation number (FN) field denoting whether a corresponding frame is the first frame, a middle frame, or the last frame of one data unit, or denoting whether a corresponding frame is one data unit itself or not, a sequence number (SN) field denoting a sequence number of a downlink or an uplink, and a CRC field for checking an error of a control header.

The MAC ID includes a protocol version field denoting a protocol version of a corresponding frame, a type field and a subtype field denoting a type of a corresponding frame and a type of data, and a transmission address (TA) field and a receipt address (RA) field denoting addresses of origination and destination.

Meanwhile, the BSR frame additionally includes a BSR control field and a BSR information field as well as a MAC ID field and a CRC field of the control header.

The BSR control field includes a superframe number field which is a sequence number of a corresponding superframe, a DL length field which is a length of one downlink, an UL length field which is a length of one uplink, a S-UL num field denoting the number of short uplinks included in a corresponding superframe, and a STA num field denoting the number of WLAN terminals using a corresponding superframe.

The BSR Info field includes an address of a corresponding terminal (STA address), a downlink (DL) bitmap field for informing corresponding terminals of allocated downlinks, a uplink (UL) bitmap field informing corresponding terminals of allocated uplinks, and an UL MCS field for informing corresponding terminals of a maximum length of a frame for transmitting data. The number of BSR Info fields is identical to the number of STA num fields of a terminal using a corresponding superframe under BSR control.

The BR frame includes a BR control field beside of a control header, a MAC ID and a CRC. The BR control field includes an AC field for denoting a type of data traffic to be transferred through a requested bandwidth and a bandwidth (BW) request size field for denoting a size of necessary bandwidth.

The data frame further includes a FSDU which is data divided not to be larger than the maximum frame size beside of a control header, a MAC ID, and a CRC.

The ACK frame includes a SSN field and an ACK bitmap beside the control header, the MAC ID and the CRC. The SSN field denotes a sequence number of the first data frame among normally received data frames through a downlink or an uplink, which must be informed through a corresponding ACK frame. The ACK bitmap field denotes whether each data frame is normally received or not.

Figure 3:
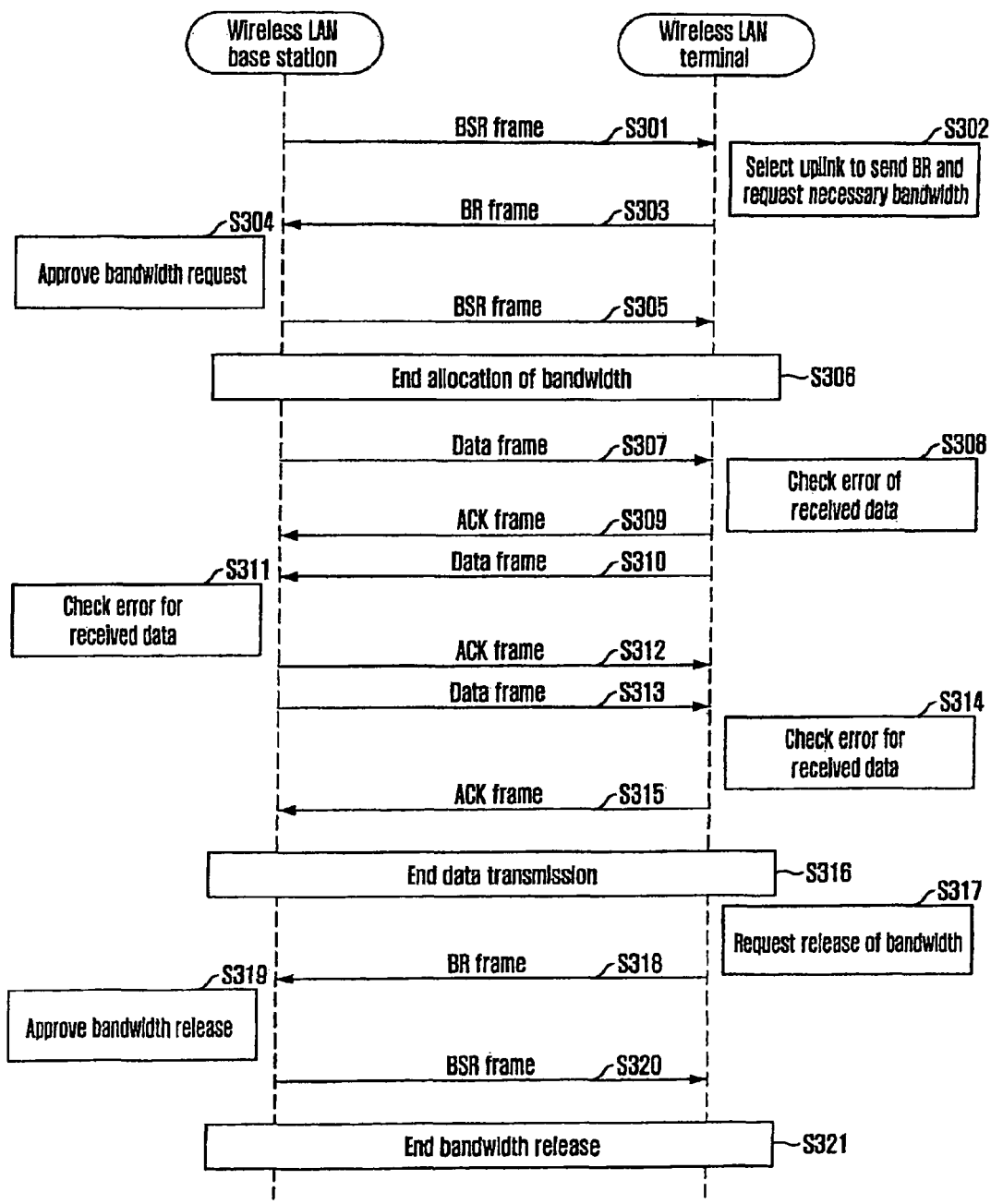
FIG. 3 is a flowchart illustrating a method for transmitting data using a MAC protocol in accordance with an embodiment of the present invention.

FIG. 3 is a flowchart illustrating a method for transmitting data using a MAC protocol in accordance with an embodiment of the present invention.

At step S301, a WLAN terminal receives a BSR frame transmitted from a base station to use a bandwidth of a WLAN. The base station transmits the BSR frame to all of terminals. At steps S302 and S303, the WLAN terminal selects one of short uplinks and transmits a BR frame for requesting necessary bandwidth to a WLAN base station through the selected short uplink.

At step S304, the WAN base station receives the BR frames from terminals and allocates downlinks and uplinks of a new superframe to each of terminals according to requested bandwidth. At step S305, the WAN base station informs all of terminals of the downlink and uplink allocation by loading allocation information in the BSR frame. At step S306, bandwidth allocation is completed between the base station and the terminals. If the WLAN base station cannot normally receive the BR frame or if the WLAN base station cannot allocate a bandwidth because there is no available bandwidth left, a terminal requests bandwidth allocation by transmitting the BR frame again after a predetermined time pass.

At steps S307 to S315, the WLAN base station and the WLAN terminals exchange data frames using the downlinks and uplinks allocated through the BSR frame, and the WLAN base station and the WLAN terminals use the ACK frame to inform the others whether the latest uplink or downlink data frame is successfully received or not. If a data frame is not successfully received, the data frame is retransmitted through the next downlink or the next uplink.

After completely transmitting data at step S316, the WLAN terminal requests bandwidth release by transmitting to the WLAN base station a BR frame with 0 of a BW request size field using an allocated uplink at steps S317 and S318. The WLAN base station releases downlink and uplink allocated to a corresponding terminal at step S319 and informs all WLAN terminals release information through a BSR frame at step S320. Then, the bandwidth release is completed at step S321.

As described above, the WLAN terminals request bandwidth allocation in a superframe unit, and the WLAN base station allocates corresponding bandwidth in the present embodiment. That is, a bandwidth is not unnecessarily occupied because an allocated bandwidth is released if the allocated bandwidth is not in use. Therefore, a limited bandwidth can be effectively used, and each terminal can provide desired QoS. In the present embodiment, the bandwidth allocation and release is performed by a unit of a downlink and an uplink which form a superframe. Therefore, it is possible to process data in a high speed because an amount of information to process for scheduling is comparatively small. Furthermore, whether a received data frame is successfully received or not is informed to the others using the next uplink or downlink. Therefore, it is possible to perform retransmission quickly if it is necessary and data reliability is improved.

The method of the present invention may be programmed in a computer language. Codes and code segments constituting the computer program may be easily inferred by a computer programmer skilled in the art. Furthermore, the computer program may be stored in a computer-readable recording medium including all kinds of media such as CD-ROM, RAM, ROM, floppy disk, hard disk and magneto-optical disk, and read and executed by a computer to embody the methods.

While the present invention has been described with respect to the specific embodiments, it will be apparent to those skilled in the art that various changes and modifications may be made without departing from the spirit and scope of the invention as defined in the following claims.

What is claimed is:

1. A medium access control (MAC) method for a wireless local area network (WLAN), comprising:
    forming a first superframe of a shared channel, wherein the first superframe comprises a plurality of downlinks, a plurality of uplinks, and a plurality of short uplinks, and wherein a total number of the plurality of downlinks is equal to a total number of the plurality of uplinks;
    transmitting a bandwidth schedule report (BSR) frame to a plurality of terminals, wherein the BSR frame is transmitted via a first downlink in the plurality of downlinks in the first superframe, and wherein the BSR frame identifies which of the uplinks and downlinks in the first superframe are allocated to which of the terminals;
    receiving a bandwidth request (BR) frame from a first terminal in the plurality of terminals, wherein the BR frame comprises a request for bandwidth allocation for the first terminal in a second superframe of the shared channel, and wherein the BR frame is received via one of the short uplinks in the first superframe;
    allocating bandwidth in the second superframe to the first terminal in response to the receiving the BR frame;
    transmitting a second BSR frame to the plurality of terminals, wherein the second BSR frame is transmitted via a first downlink in the second superframe, and wherein the second BSR frame identifies which of uplinks and downlinks in the second superframe are allocated to which of the terminals; and
    transmitting data frames and an acknowledge frame to one or more of the terminals, wherein the data frames and the acknowledge frame are transmitted via one or more allocated downlinks in the second superframe.

2. The MAC method of claim 1, wherein each of the plurality of downlinks in the first superframe comprises an acknowledge frame for informing whether data frames included in a previous uplink are successfully received or not, and wherein each of the plurality of downlinks in the first superframe comprises a plurality of downlink data frames.

3. The MAC method of claim 2, wherein each of the plurality of uplinks in the first superframe comprises an acknowledge frame for informing whether data frames included in a previous downlink are successfully received or not, and wherein each of the plurality of uplinks in the first superframe comprises a plurality of uplink data frames.

4. The MAC method of claim 3, wherein the BSR frame comprises a control header for informing control information of a frame, a medium access control identifier (MAC ID) for informing a type, a transmission address, and an origination address of data in a frame, a BSR control field for informing configuration information of the first superframe and the number of terminals allocated with a bandwidth, a BSR information field for informing a bandwidth allocated to each of terminals allocated with a bandwidth, and a cyclic redundancy check (CRC) field for checking an error of a frame.

5. The MAC method of claim 4, wherein the BSR control field comprises a sequence number of the first superframe, a length of one downlink, a length of one uplink, the number of short uplinks included in the first superframe, and the number of terminals using the first superframe.

6. The MAC method of claim 4, wherein the BSR information field comprises an address of a corresponding terminal information for informing a corresponding terminal of allocated downlinks, information for informing a corresponding terminal of allocated uplinks, and a maximum length of a frame available to a corresponding terminal for transmitting data to an uplink.

7. The MAC method of claim 3, wherein the BR frame comprises a control header for informing control information, a MAC ID for informing a type, a transmission address, and an origination address of data in a frame, information on a type of data traffic to be transmitted through a requested bandwidth, information on a size of a necessary bandwidth, and a cyclic redundancy check (CRC) field for checking an error of a frame.

8. The MAC method of claim 3, wherein each of the acknowledge frames comprises a control header for informing control information, a MAC ID for informing a type, a transmission address, and a receipt address of data loaded in a frame, a sequence number of a first data frame among successfully received data frames, information on whether each of data frames are successfully received or not from a data frame having the sequence number, and a cyclic redundancy check (CRC) field for checking an error of a frame.

9. A method for transmitting data using a medium access control (MAC) protocol in a wireless local area network (WLAN), comprising:
   forming a first superframe of a shared channel, wherein the first superframe comprises a plurality of downlinks, a plurality of uplinks, and a plurality of short uplinks, and wherein a total number of the plurality of downlinks is equal to a total number of the plurality of uplinks;
   transmitting a bandwidth schedule report (BSR) frame to a plurality of terminals, wherein the BSR frame is transmitted via a first downlink in the plurality of downlinks in the first superframe, and wherein the BSR frame identifies which of the uplinks and downlinks in the first superframe are allocated to which of the terminals;
   receiving a bandwidth request (BR) frame from a first terminal in the plurality of terminals, wherein the BR frame comprises a request for bandwidth allocation for the first terminal in a second superframe of the shared channel, and wherein the BR frame is received via one of the short uplinks in the first superframe;
   allocating bandwidth in the second superframe to the first terminal in response to the receiving the BR frame;
   transmitting a second BSR frame to the plurality of terminals, wherein the second BSR frame is transmitted via a first downlink in the second superframe, and wherein the second BSR frame identifies which of uplinks and downlinks in the second superframe are allocated to which of the terminals; and
   transmitting data frames and an acknowledge frame to one or more of the terminals, wherein the data frames and the acknowledge frame are transmitted via one or more allocated downlinks in the second superframe.

10. The method of claim 9, wherein the BSR frame comprises a control header for informing control information of a frame, a medium access control identifier (MAC ID) for informing a type, a transmission address, and an origination address of data in a frame, a BSR control field for informing configuration information of the first superframe and the number of terminals allocated with a bandwidth, a BSR information field for informing a bandwidth allocated to each of terminals allocated with a bandwidth, and a cyclic redundancy check (CRC) field for checking an error of a frame.

11. The method of claim 10, wherein the BSR control field comprises a sequence number of the first superframe, a length of one downlink, a length of one uplink, the number of short uplinks included in the first superframe, and the number of terminals using the first superframe.

12. The method of claim 10, wherein the BSR information field comprises an address of a corresponding terminal information for informing a corresponding terminal of allocated downlinks, information for informing a corresponding terminal of allocated uplinks, and a maximum length of a frame available to a corresponding terminal for transmitting data to an uplink.

13. The method of claim 9, wherein the BR frame comprises a control header for informing control information, a MAC ID for informing a type, a transmission address, and an origination address of data in a frame, information on a type of data traffic to be transmitted through a requested bandwidth, information on a size of a necessary bandwidth, and a cyclic redundancy check (CRC) field for checking an error of a frame.

14. The method of claim 9, wherein the acknowledge frame comprises a control header for informing control information, a MAC ID for informing a type, a transmission address, and receipt address of data loaded in a frame, a sequence number of a first data frame among successfully received data frames, information on whether each of data frames are successfully received or not from a data frame having the sequence number, and a cyclic redundancy check (CRC) field for checking an error of a frame.

15. A method for transmitting data using a medium access control (MAC) protocol in a wireless local area network (WLAN), comprising:
   receiving, by a terminal, a bandwidth schedule report (BSR) frame from a base station, wherein the BSR frame is received via a first downlink in a plurality of downlinks in a first superframe of a shared channel, wherein the first superframe comprises the plurality of downlinks, a plurality of uplinks, and a plurality of short uplinks, and wherein the BSR frame identifies which of the uplinks and downlinks in the first superframe are allocated to the terminal;
   transmitting, by the terminal, a bandwidth request (BR) frame to the base station, wherein the BR frame comprises a request for bandwidth allocation for the terminal in a second superframe of the shared channel, and wherein the BR frame is transmitted via one of the short uplinks in the first superframe;

receiving, by the terminal, a second BSR frame from the base station, wherein the second BSR frame is received via a first downlink in the second superframe, wherein the second BSR frame identifies which of uplinks and downlinks in the second superframe are allocated to the terminal, and wherein the uplinks and downlinks in the second superframe that are allocated to the terminal correspond to the request in the BR frame; and transmitting, by the terminal, data frames and an acknowledge frame to the base station, wherein the data frames and the acknowledge frame are transmitted via one or more allocated uplinks in the second superframe.

16. The method of claim 15, wherein the BSR frame comprises a control header for informing control information of a frame, a medium access control identifier (MAC ID) for informing a type, a transmission address, and an origination address of data in a frame, a BSR control field for informing configuration information of the first superframe and the number of terminals allocated with a bandwidth, a BSR information field for informing a bandwidth allocated to each of terminals allocated with a bandwidth, and a cyclic redundancy check (CRC) field for checking an error of a frame.

17. The method of claim 16, wherein the BSR control field comprises a sequence number of the first superframe, a length of one downlink, a length of one uplink, the number of short uplinks included in the first superframe, and the number of terminals using the first superframe.

18. The method of claim 16, wherein the BSR information field comprises an address of a corresponding terminal information for informing a corresponding terminal of allocated downlinks, information for informing a corresponding terminal of allocated uplinks, and a maximum length of a frame available to a corresponding terminal for transmitting data to an uplink.

19. The method of claim 15, wherein the BR frame comprises a control header for informing control information, a MAC ID for informing a type, a transmission address, and an origination address of data in a frame, information on a type of data traffic to be transmitted through a requested bandwidth, information on a size of a necessary bandwidth, and a cyclic redundancy check (CRC) field for checking an error of a frame; and wherein the acknowledge frame comprises a control header for informing control information, a MAC ID for informing a type, a transmission address, and receipt address of data loaded in a frame, a sequence number of a first data frame among successfully received data frames, information on whether each of data frames are successfully received or not from a data frame having the sequence number, and a cyclic redundancy check (CRC) field for checking an error of a frame.

20. The method of claim 1, wherein the plurality of short uplinks are positioned in the first superframe after the plurality of downlinks and the plurality of uplinks.

* * * * *